(12) United States Patent
Kuromizu

(10) Patent No.: US 8,220,942 B2
(45) Date of Patent: Jul. 17, 2012

(54) LIGHTING DEVICE FOR DISPLAY DEVICE, DISPLAY DEVICE, AND TELEVISION RECEIVER APPARATUS

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 359 days.

(21) Appl. No.: 12/594,920

(22) PCT Filed: Dec. 10, 2007

(86) PCT No.: PCT/JP2007/073775
§ 371 (c)(1),
(2), (4) Date: Oct. 6, 2009

(87) PCT Pub. No.: WO2008/129725
PCT Pub. Date: Oct. 30, 2008

(65) Prior Publication Data
US 2010/0118518 A1    May 13, 2010

(30) Foreign Application Priority Data
Apr. 9, 2007   (JP) .................................. 2007-102045

(51) Int. Cl.
*G09F 13/04* (2006.01)
(52) U.S. Cl. ................. 362/97.1; 362/97.2; 362/249.02; 362/632; 362/634
(58) Field of Classification Search .................. 362/97.1, 362/97.2, 97.4, 532, 533, 534, 558, 249.02, 362/249.03
See application file for complete search history.

(56) References Cited

U.S. PATENT DOCUMENTS

| | | | | |
|---|---|---|---|---|
| 7,325,937 B2 * | 2/2008 | Aoki et al. | | 362/97.1 |
| 7,490,971 B2 * | 2/2009 | Iwasaki | | 362/628 |
| 7,826,005 B2 * | 11/2010 | Lee et al. | | 349/64 |
| 2009/0059563 A1 | 3/2009 | Takata et al. | | |

FOREIGN PATENT DOCUMENTS

| | | |
|---|---|---|
| JP | 2004-219838 A | 8/2004 |
| JP | 2004-233828 A | 8/2004 |
| JP | 2005-203164 A | 7/2005 |
| JP | 2007-33962 A | 2/2007 |
| JP | 2007-65120 A | 3/2007 |
| JP | 2007-086648 | 4/2007 |
| KR | 10-2005-0058104 A | 6/2005 |
| WO | WO 2007/000851 A1 | 1/2007 |

* cited by examiner

*Primary Examiner* — Ali Alavi
(74) *Attorney, Agent, or Firm* — Birch, Stewart, Kolasch & Birch, LLP

(57) ABSTRACT

In a chassis 13, a cold cathode tube 15 is housed, a planar optical member 16 is provided in an opening portion, and a support component 20 that can support the optical member 16 is mounted. The support component 20 includes a linear support portion 24 linearly extending in parallel with a plane direction of the optical member 16. The linear support portion 24 is curved to become progressively lower from end sides toward a middle side of the optical member 16. The optical member 16 can be warped and deformed by a gap ensured between the optical member 16 and the linear support portion 24. When the optical member 16 is warped and deformed, the linear support portion 24 supports the optical member 16 in a height position corresponding to the warped shape.

25 Claims, 20 Drawing Sheets

LIGHTING DEVICE FOR DISPLAY DEVICE, DISPLAY DEVICE, AND TELEVISION RECEIVER APPARATUS

TECHNICAL FIELD

The present invention relates to a lighting device for a display device, a display device, and a television receiver apparatus.

BACKGROUND ART

A liquid crystal display device includes a liquid crystal panel, and a backlight provided on a back surface side of the liquid crystal panel. The backlight includes a chassis housing a light source such as a cold cathode tube and having an opening surface on a light emitting side, and an optical member provided in an opening portion of the chassis and having a function of converting a light emitted from the light source into a uniform planar light.

The optical member includes a diffuser plate containing a plurality of diffusing particles dispersed in a transparent base material having a predetermined thickness, and an outer peripheral end portion thereof is received and supported by a catch in the chassis. Meanwhile, a more inner portion than the outer peripheral end portion of the diffuser plate is supported by a support component mounted to the chassis.

A known example of such a support component is described in Patent Document 1. This support component includes a support pin protruding toward a diffuser plate, and a tip portion of the support pin abuts at a point against a more inner portion than an outer peripheral end portion of the diffuser plate to support the diffuser plate. A plurality of support pins are arranged so as to support the diffuser plate in different positions in a plane direction.

Meanwhile, an example of a support component using a surface emitting flat lamp as a light source is described in Patent Document 2. This support component includes a linear support portion having a top extending in one direction, and linearly supports a diffuser plate.

[Patent Document 1] Japanese Patent Laid-Open No. 2004-219838
[Patent Document 2] Japanese Patent Laid-Open No. 2005-203164

Problems to be Solved by the Invention

The above described diffuser plate is sometimes warped into an arc shape toward a light source as the light source is lit and a temperature in the chassis is increased. However, since the support pins described in Patent Document 1 all have the same height, the diffuser plate may be bent into a corrugated shape toward the light source with a support position by each support pin as a fulcrum. Then, the corrugated bent portion may significantly reduce display quality of a liquid crystal display device.

Meanwhile, the support portion described in Patent Document 2 linearly supports the diffuser plate, and the diffuser plate is hard to be bent as described above in an extending direction of the support portion. However, since the support portion has a fixed height over the entire length, the diffuser plate to be warped and deformed toward the light source may press the support portion to cause a problem such as a groan.

DISCLOSURE OF THE INVENTION

The present invention is achieved in view of the above described circumstances and has an object to properly support an optical member.

Means for Solving the Problems

The present invention includes: a chassis housing a light source that applies a light to a display panel that displays an image; a planar optical member provided on an emission side of the light emitted from the light source; and a support component that is mounted to the chassis and can support the optical member from the side of the light source, wherein the support component includes a lower support portion corresponding to a middle side of the optical member and a higher support portion corresponding to an end side of the optical member, and supports the optical member perpendicularly to a plane direction of the optical member in a fixed position at least in the lower support portion.

If the optical member is warped and deformed toward the light source as the light source is lit or the like, the optical member is shaped to become lower from the end side toward the middle side. At this time, the optical member can be supported in a position matching the warped shape by the lower support portion and the higher support portion of the support component. Thus, the optical member can be supported in a state where the optical member can be warped and deformed and the optical member is hard to be bent. Also, the optical member is supported in the fixed position in the lower support portion, thereby allowing excessive warping deformation of the optical member to be controlled.

BEST MODE FOR CARRYING OUT THE INVENTION

Embodiment 1

Embodiment 1 of the present invention will be described with reference to FIGS. 1 to 6. In Embodiment 1, a liquid crystal display device D is exemplified as a display device.

Figure 1:
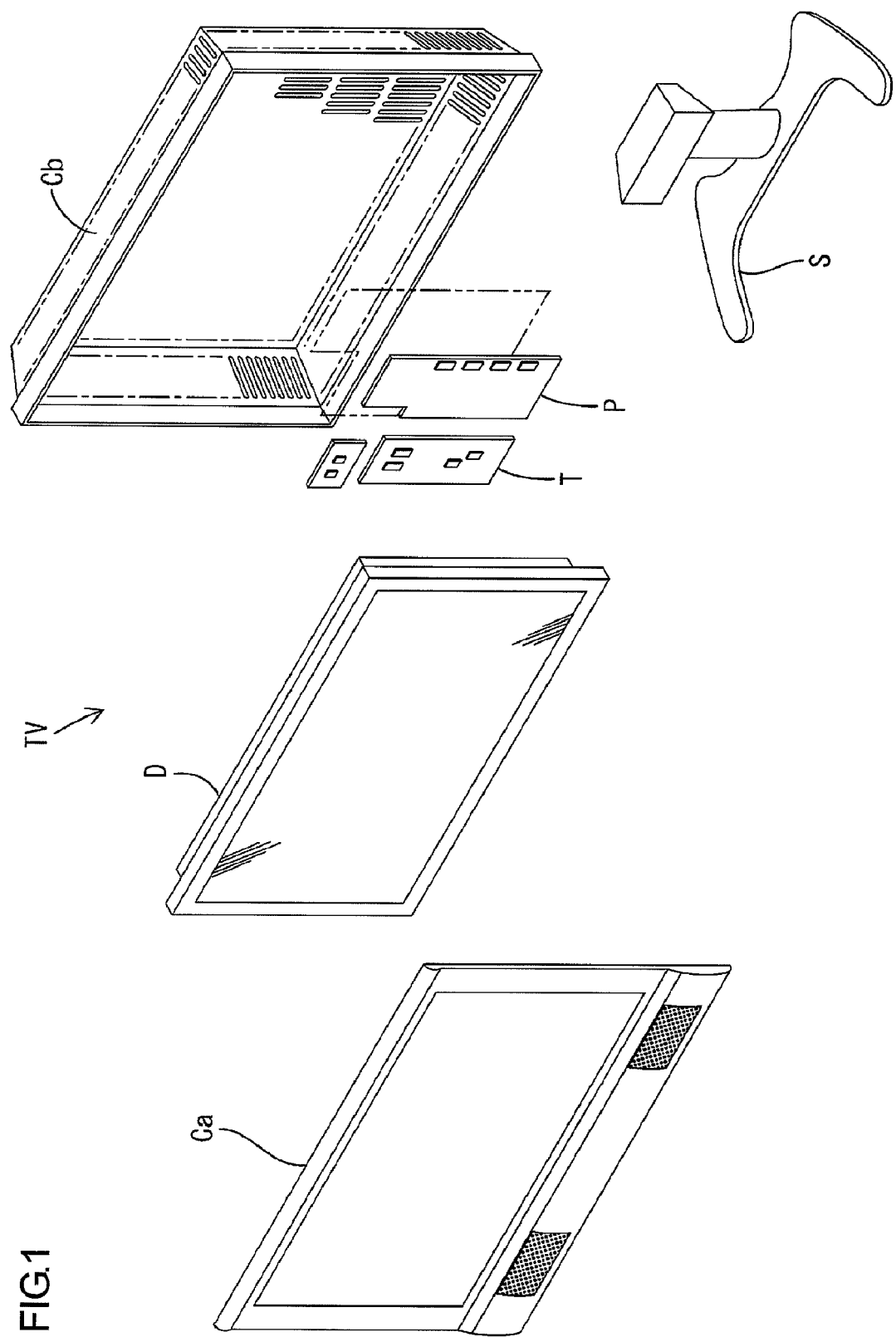
FIG. 1 is a schematic exploded view of a television receiver apparatus according to Embodiment 1 of the present invention.
Figure 3:
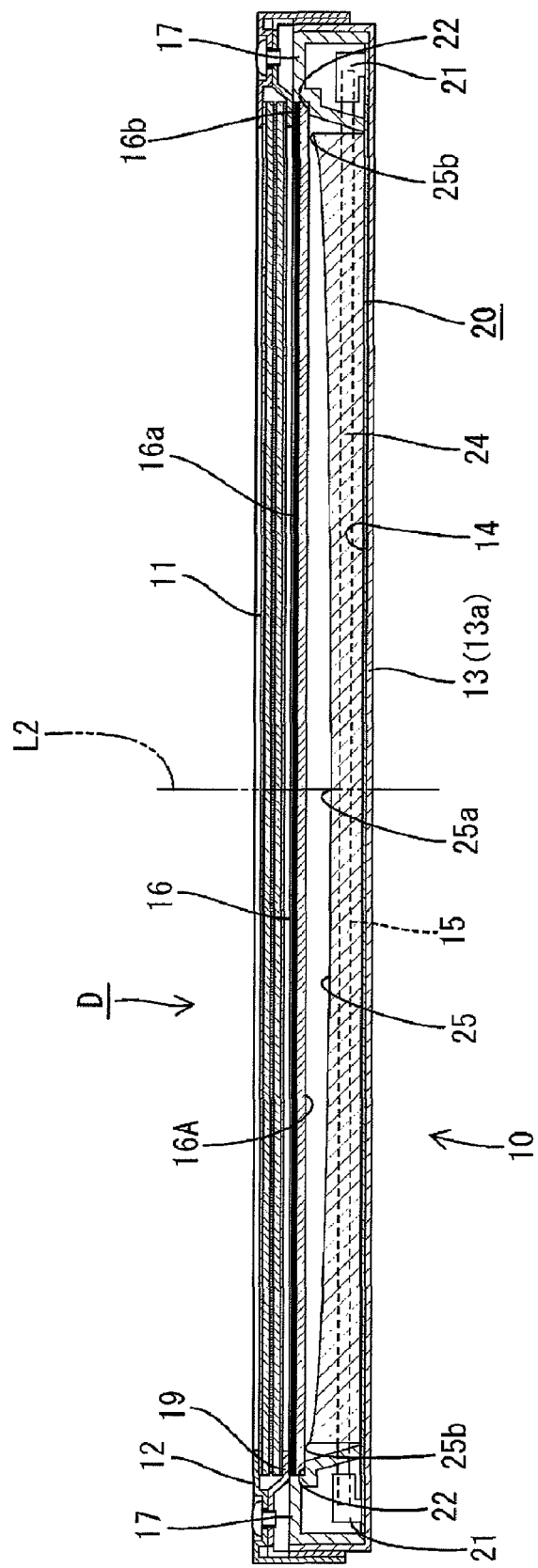
FIG. 3 is a sectional view taken along the line A-A in FIG. 2.

The liquid crystal display device D has a generally horizontally oriented rectangular shape, and includes, as shown in FIG. 3, a liquid crystal panel 11 as a display panel and a backlight 10 as an external light source (illumination device) of the liquid crystal panel 11 assembled to each other and held by a bezel 12 placed on a front side. The liquid crystal panel 11 is placed on a front surface side of the backlight 10, and the backlight 10 illuminates the liquid crystal panel 11 from a back surface side. The liquid crystal display device D can be applied to a television receiver apparatus TV. The television receiver apparatus TV includes, as shown in FIG. 1, the liquid crystal display device D, front and back cabinets Ca and Cb that sandwich and house the liquid crystal display device D, a power supply P, a tuner T, and a stand S.

As shown in FIG. 3, the liquid crystal panel 11 has a known structure in which a liquid crystal that is a substance having varying optical properties with application of a voltage is sealed in a gap between a transparent TFT substrate and a transparent CF substrate. A TFT (Thin Film Transistor) as a switching element connected to source wiring and gate wiring perpendicular to each other is provided on the TFT substrate, and three color filters of red (R), green (G) and blue (B) are arranged in a matrix on the CF substrate. Also, a polarizing plate is attached to the side opposite to the liquid crystal of each substrate.

The backlight 10 is of a so-called direct type, and includes a chassis 13 having an opening surface on a front side (an upper side in FIGS. 3 and 4, a front surface side) that is a light emission side, a reflective sheet 14 laid in the chassis 13, a plurality of cold cathode tubes 15 housed in the chassis 13, an optical member 16 provided in an opening portion of the chassis 13, that is, on the emission side of lights emitted from the cold cathode tubes 15, positioning members (a lamp holder 17, a holder 18, and a frame 19 described later) that can position the optical member 16, and a support component 20 that can support the cold cathode tubes 15 and the optical member 16.

Figure 2:
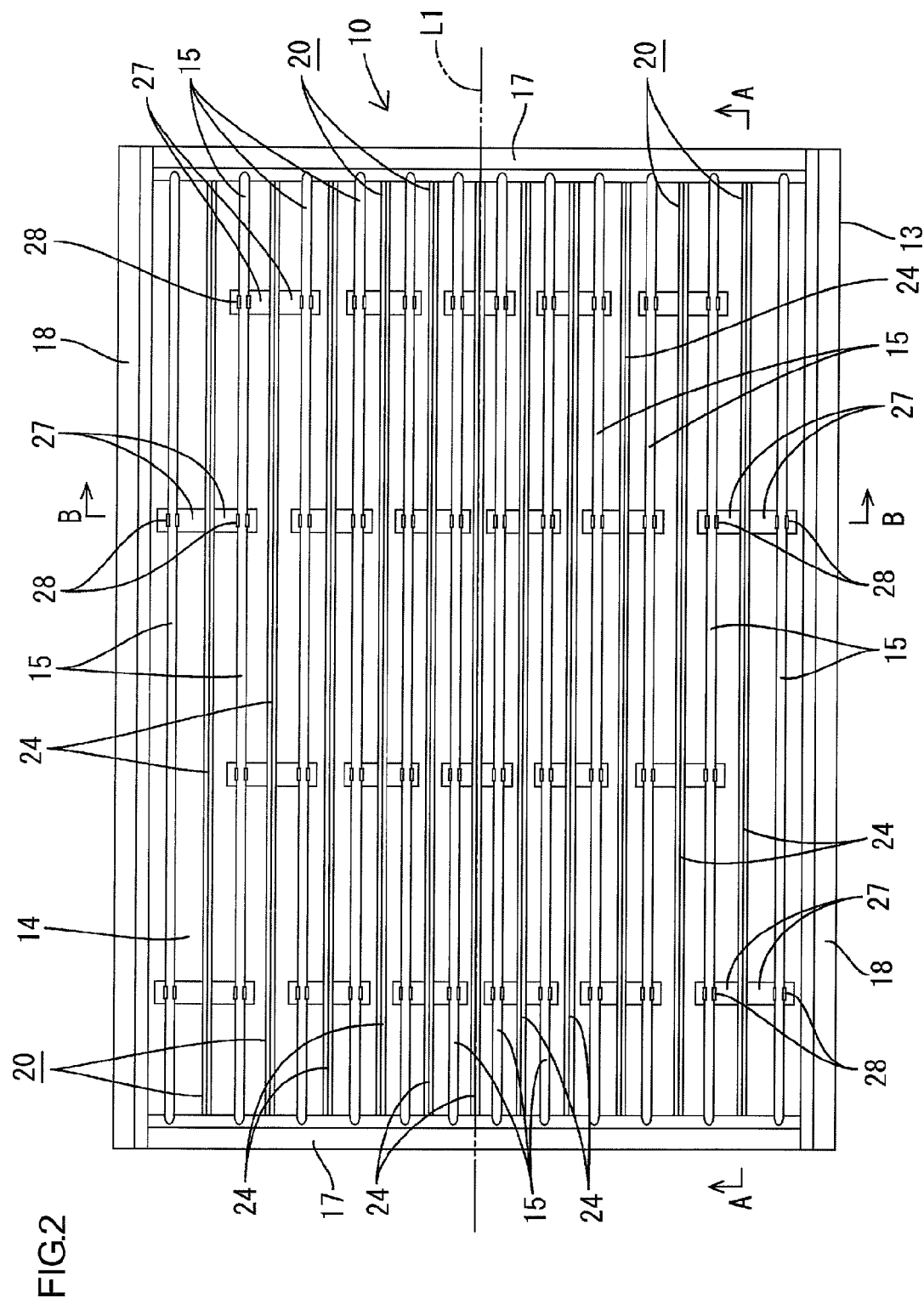
FIG. 2 is a plan view of a backlight.

The chassis 13 is made of metal, and formed into a rectangular on plan view and shallow substantially box shape having an opening surface on a front side as shown in FIG. 2. The reflective sheet 14 is made of synthetic resin, has a surface with white base color such as white with high reflectivity, and is laid on an inner surface of the chassis 13 so as to substantially cover the entire inner surface. The reflective sheet 14 can guide the light emitted from each cold cathode tube 15 to the opening portion of the chassis 13.

The cold cathode tube 15 is a kind of elongated linear light source extending in one direction along a bottom plate 13a of the chassis 13 or the plane direction of the optical member 16, and is mounted in the chassis 13 with an axial direction thereof matching a long side direction of the chassis 13. The plurality of cold cathode tubes 15 are arranged axially substantially in parallel with predetermined spaces therebetween. More specifically describing the space (pitch, distance) between adjacent cold cathode tubes 15, a space between cold cathode tubes 15 placed in the middle in a short side direction of the chassis 13 or the optical member 16 is smallest, and the space progressively increases therefrom toward end sides. In other words, a density of arrangement of the cold cathode tubes 15 in the chassis 13 is higher on the middle side of a screen, and becomes progressively lower toward end sides of the screen. The cold cathode tubes 15 are arranged symmetrically with respect to an axis of symmetry L1 (a dash-double-dot line in FIG. 2) in a middle position in the short side direction of the chassis 13.

The cold cathode tube 15 is configured so that mercury or the like is sealed in an elongated glass tube having a circular section, an inner wall surface of the tube is coated with a fluorescent material, and electrodes are sealed in opposite end portions. A rubber holder 21 mounted to the chassis 13 is fitted to a non-light-emitting portion at each end of the cold cathode tube 15.

Figure 4:
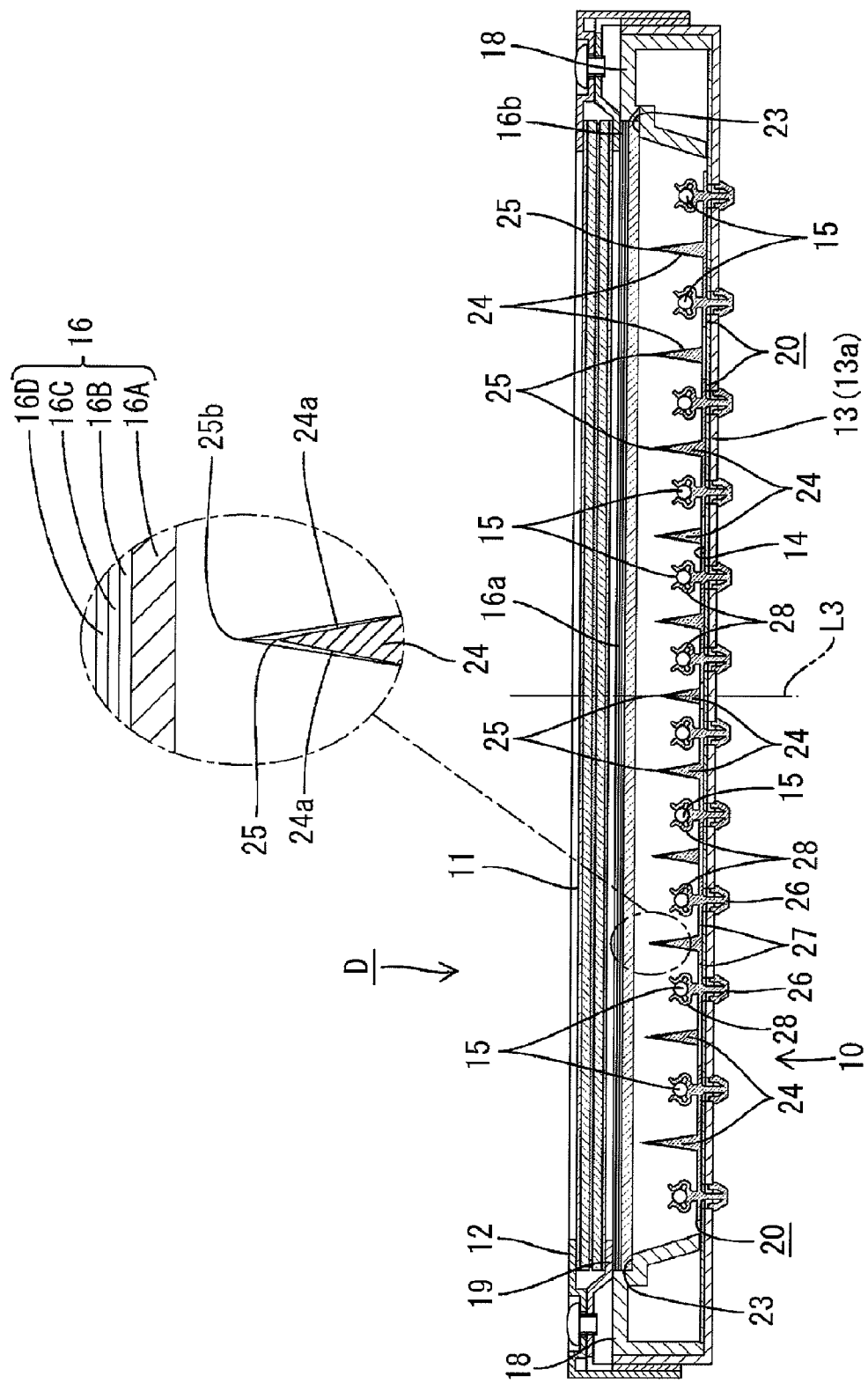
FIG. 4 is a sectional view taken along the line B-B in FIG. 2.

The optical member 16 has a rectangular shape on plan view like the chassis 13 and the liquid crystal panel 11 as shown in FIGS. 3 and 4, is made of translucent synthetic resin, mounted to the opening portion of the chassis 13 and interposed between the group of cold cathode tubes 15 and the liquid crystal panel 11. The optical member 16 includes a diffuser plate 16A, a diffusion sheet 16B, a lens sheet 16C, and a luminance increasing sheet 16D laminated in order from a back side (a lower side in FIGS. 3 and 4, a back surface side), and has a function of converting the light emitted from each cold cathode tube 15 as the linear light source into a uniform planar light or the like. The diffuser plate 16A placed on the backmost side has a sufficiently larger thickness than other sheets 16B to 16D and has relatively high rigidity. The diffuser plate 16A contains a plurality of diffusing particles dispersed in a transparent base material having a predetermined thickness, and is thus formed to be generally translucent.

The diffuser plate 16A is sometimes warped and deformed by an influence of ambient temperature environment or the like. In this case, the sheets 16B to 16D are also deformed following the warped and deformed diffuser plate 16A. If the optical member 16 is warped and deformed toward the liquid crystal panel 11 at this time, the optical member 16 presses the middle portion of the liquid crystal panel 11 to cause poor display. Thus, the diffuser plate 16A is subjected to so-called previous warping so as to have a warping habit to be warped toward the cold cathode tube 15. The previous warping is performed by heating only a surface on the front side (on the side opposite to the cold cathode tube 15) of the base material while the base material passes between upper and lower rollers in a process of producing the diffuser plate 16A. Thus, the diffuser plate 16A has a warping habit such that the heated-side surface is deformed to be recessed (the middle side is retracted from the outer peripheral end portion 16b toward the back side (toward the cold cathode tube 15).

The positioning member includes the lamp holder 17 and the holder 18 that constitute a frame-shaped catch member that receives the outer peripheral end portion 16b of the optical member 16 on the back side, and the frame 19 that constitutes a frame-shaped presser member that presses the outer peripheral end portion 16b of the optical member 16 from the front side.

The lamp holder 17 is made of synthetic resin having a surface with white base color such as white, and as shown in FIGS. 2 and 3, a pair of lamp holders 17 are mounted to opposite end positions in the long side direction of the chassis 13 and extend in the short side direction of the chassis 13. The lamp holder 17 has a substantially box shape with an opening back surface side so as to collectively cover the rubber holders 21 mounted to the cold cathode tubes 15 from the front side. A catch 22 that can receive the optical member 16 is formed to be recessed with a step in an inner peripheral end portion on a front side surface of the lamp holder 17.

The holder 18 is made of synthetic resin having a surface with white base color such as white, and as shown in FIGS. 2 and 4, a pair of holders 18 are mounted to opposite end positions in the short side direction of the chassis 13 and extend in the long side direction of the chassis 13. Like the lamp holder 17, a catch 23 for the optical member 16 is formed to be recessed with a step in an inner peripheral end portion on a front side surface of the holder 18.

The frame 19 is made of metal and formed into a frame shape, and as shown in FIGS. 3 and 4, can press the outer peripheral end portion 16b of the optical member 16 substantially over the entire periphery from the front side. The frame 19 has, in the inner peripheral end portion, a presser surface facing a plate surface of the optical member 16. The presser surface is placed with a slight clearance from a plate surface on the front side of the luminance increasing sheet 16D on the frontmost side in the assembled state, and this allows thermal expansion or contraction of the optical member 16.

Then, the support component 20 will be described in detail. The support component 20 is made of synthetic resin, and has an entire surface with white base color such as white with high light reflectivity. As shown in FIGS. 2 and 3, the support component 20 is mounted to the bottom plate 13a of the chassis 13, and includes a linear support portion 24 that can support the optical member 16.

The linear support portion 24 linearly extends in parallel with the bottom plate 13a of the chassis 13 or the plane direction of the optical member 16. An extending direction of the linear support portion 24 matches the long side direction of the chassis 13 and the axial direction of the cold cathode tube 15. The linear support portion 24 protrudes from the bottom plate 13a of the chassis 13 toward the optical member 16, and a tip portion 25 thereof can linearly support, in the long side direction, the middle side portion 16a except the outer peripheral end portion 16b supported by the lamp holder 17 and the holder 18 of the optical member 16. The linear support portion 24 has a length such that opposite end portions 25b thereof are placed close to the catch 22 of the lamp holder 17, and thus can support the middle side portion 16a except the outer peripheral end portion 16b in the optical member 16 substantially over the entire length in the long side direction.

In the linear support portion 24, the tip portion 25 is curved so that a height from the bottom plate 13a of the chassis 13 becomes progressively lower from the opposite end portions 25b toward the middle portion 25a in the length direction. Specifically, the tip portion 25 of the linear support portion 24 is formed into a gentle arc shape seen from the lateral side and has a continuously varying height position, and the middle portion 25a in the length direction is lowest and the opposite end portions 25b are highest. The linear support portion 24 is symmetrical with respect to an axis of symmetry L2 (a dash-double-dot line in FIG. 3) in the middle in the length direction. Thus, the tip portion 25 of the linear support portion 24 is formed along the warped shape of the diffuser plate 16A, and the height position is set in a position matching a supposed warped shape of the diffuser plate 16A.

The opposite end portions 25b at the highest level of the tip portion 25 of the linear support portion 24 are placed at a lower level than the catches 22 and 23, and the tip portion 25 is placed in a position at a predetermined gap from the back side surface of the diffuser plate 16A in no contact therewith when the diffuser plate 16A is straight and substantially parallel to the bottom plate 13a of the chassis 13, that is, the diffuser plate 16A is not warped. In this state, a gap between the tip portion 25 of the linear support portion 24 and the back side surface of the diffuser plate 16A is largest in the middle portion 25a and smallest in the opposite end portions 25b. Thus, the optical member 16 can be warped and deformed by the gap ensured between the optical member 16 and the linear support portion 24. Specifically, the linear support portion 24 does not support the diffuser plate 16A when the diffuser plate 16A is not warped, and supports the diffuser plate 16A after the diffuser plate 16A is warped.

Meanwhile, the middle portion 25a at the lowest level of the tip portion 25 of the linear support portion 24 is placed at a higher level than the cold cathode tube 15. Thus, even when the diffuser plate 16A is warped and deformed to the maximum, the diffuser plate 16A is supported by the linear support portion 24 and thus held in a position at a predetermined gap from the cold cathode tube 15 in no contact therewith. Thus, a lamp image of the cold cathode tube 15 is hard to be visually identified by a user. The linear support portion 24 is placed to laterally face the light emitting portion except the opposite end portions (portions to which the lamp holders 17 are mounted) that are the non-light-emitting portions of the cold cathode tube 15 over the entire length and height.

The linear support portion 24 has a bottom surface that entirely abuts against the reflective sheet 14 and has a solid structure, and the entire linear support portion 24 is a secured part (rigid body) that cannot be elastically deformed. Thus, the optical member 16 is supported vertically (perpendicularly to the plane direction of the optical member 16) by the linear support portion 24 in a fixed and unchanged position over the entire length.

As shown in FIGS. 2 and 4, the linear support portion 24 has a constant width over the entire length in the length direction, but has a progressively decreasing width from a base end side (the side of the bottom plate 13a of the chassis 13) toward a tip side (the side of the optical member 16) in the height direction so as to be tapered. Specifically, the linear support portion 24 has a substantially isosceles triangular (triangular) section in a lateral direction perpendicular to the length direction. Thus, the tip portion 25 as a vertex of the linear support portion 24 has a point-shaped section in the lateral direction and a linear section in the length direction. Opposite side surfaces 24a of the linear support portion 24 are inclined surfaces directed obliquely upward in FIG. 4, that is, toward the optical member 16. This can avoid the linear support portion 24 from blocking the light emitted from the cold cathode tube 15, and the light is reflected by the inclined side surfaces 24a to allow the light to be effectively guided toward the liquid crystal panel 11.

A plurality of support components 20 are arranged in the short side direction of the chassis 13. Each linear support portion 24 is placed in a middle position between the cold cathode tubes 15 arranged in parallel. Thus, for a space between adjacent linear support portions 24, a space between linear support portions 24 placed in the middle in the short side direction of the chassis 13 or the optical member 16 is smallest, and the space progressively increases therefrom toward end sides. In other words, a density of arrangement of the linear support portions 24 in the chassis 13 is higher on the middle side of the screen, and becomes progressively lower toward the end sides of the screen. The linear support portions 24 are arranged symmetrically with respect to an axis of symmetry L3 (a dash-double-dot line in FIG. 4) in a middle position in the short side direction of the chassis 13.

For the height (the height position of the tip portion 25) of each of the linear support portions 24 arranged in the short side direction of the chassis 13 or the optical member 16, the linear support portion 24 placed in the middle in the short side direction is lowest and the linear support portions 24 placed at opposite ends are highest, and the height gradually decreases from the opposite end sides toward the middle side. The tip portions 25 of the linear support portions 24 are connected to form a curve of a gentle arc shape, and an outer shape thereof matches the shape of the diffuser plate 16A warped and deformed in the short side direction. Specifically, the height positions of the tip portions 25 of the linear support portions 24 are set in a position matching a supposed warped shape of the diffuser plate 16A. For a surface area of each linear support portion 24, the linear support portion 24 placed in the middle in the short side direction of the optical member 16 is smallest, and the linear support portions 24 provided in opposite ends are largest, and the surface area progressively increases from the middle side toward the opposite end sides. Specifically, the surface area of the linear support portion 24 is proportional to a space between corresponding cold cathode tubes 15.

As is apparent from the above described configuration, the middle portion 25a in the length direction of the linear support portion 24 placed in the middle in the short side direction of the optical member 16 corresponds to the middle portion (central portion) in the long side direction and the short side direction of the optical member 16 and is at the lowest level, and the opposite end portions 25b in the length direction of the linear support portion 24 placed at the opposite ends in the short side direction correspond to parts adjacent to the outer peripheral end portions 16b of the optical member 16 and are at the highest level.

On positions inward of the opposite end portions 25b in the length direction of the linear support portion 24, a pair of plate portions 27 are provided to protrude toward opposite lateral sides along the bottom plate 13a of the chassis 13. On a back side surface of each plate portion 27, a locking portion 26 is provided passing through a mounting hole provided in the chassis 13 and lockable to a hole edge on the back side. Thus, the support component 20 is mounted and held on the chassis 13.

Meanwhile, on a front side surface of each plate portion 27, a light source gripping portion 28 that can grip the cold cathode tube 15 is provided to protrude toward the optical member 16. The light source gripping portion 28 has a substantially C-shaped section with an opening portion on the front side, and the cold cathode tube 15 is mounted through the opening portion on the front side. The light source gripping portion 28 can be elastically deformed with attachment and detachment of the cold cathode tube 15. Thus, each cold cathode tube 15 can be supported in a position at a predetermined height above the bottom plate 13a of the chassis 13. The light source gripping portion 28 is provided adjacent to a lateral side of the linear support portion 24. The length of the plate portion 27 and an installation position of the light source gripping portion 28 in each support component 20 correspond to the above described mounting position of the cold cathode tube 15 to the chassis 13.

The liquid crystal display device D having the above described configuration is produced as described below. The liquid crystal panel 11 and the backlight 10 are individually produced and assembled using the bezel 12 or the like to produce the liquid crystal display device D. In the backlight 10, the reflective sheet 14 is laid in the chassis 13, then each support component 20 is mounted to a predetermined position, and each cold cathode tube 15 having the rubber holders 21 fitted to the opposite ends is mounted, and thus the light source gripping portion 28 of the support component 20 elastically grips the cold cathode tube 15 in a predetermined height position.

Then, when the lamp holder 17 and the holder 18 are mounted in the chassis 13, the optical member 16 is placed on the catches 22 and 23 of the lamp holder 17 and the holder 18 in order of the diffuser plate 16A, the diffusion sheet 16B, the lens sheet 16C, and the luminance increasing sheet 16D. Then, the frame 19 is mounted to position the optical member 16.

In the liquid crystal display device D produced as described above, when each cold cathode tube 15 is lit in use, heat generated from the cold cathode tube 15 increases temperature in the chassis 13. Then, the diffuser plate 16A may be warped depending on the temperature environment. In this case, since the linear support portions 24 are provided with a predetermined gap therebetween on the back side of the diffuser plate 16A to be ready to receive the diffuser plate 16A, the diffuser plate 16A can be warped and deformed in both the long side direction and the short side direction. Thus, as compared with a device in which a diffuser plate 16A cannot be warped and deformed, a groan is hard to be caused.

The diffuser plate 16A is subjected to previous warping as described above, and thus deformed so that the middle portion thereof is warped and deformed so as to be recessed toward the cold cathode tube 15. At this time, in the diffuser plate 16A, the middle side portion 16a is warped and deformed into an arc shape with the outer peripheral end portions 16b supported by the catches 22 and 23 of the lamp holder 17 and the holder 18 as fulcrums. When the diffuser plate 16A is warped, the sheets 16B to 16D laminated on the front side are warped and deformed following the diffuser plate 16A. At this time, the diffuser plate 16A is warped and deformed only in the long side direction or the short side direction in some cases, and warped and deformed in both the long side direction and the short side direction in other cases.

Figure 5:
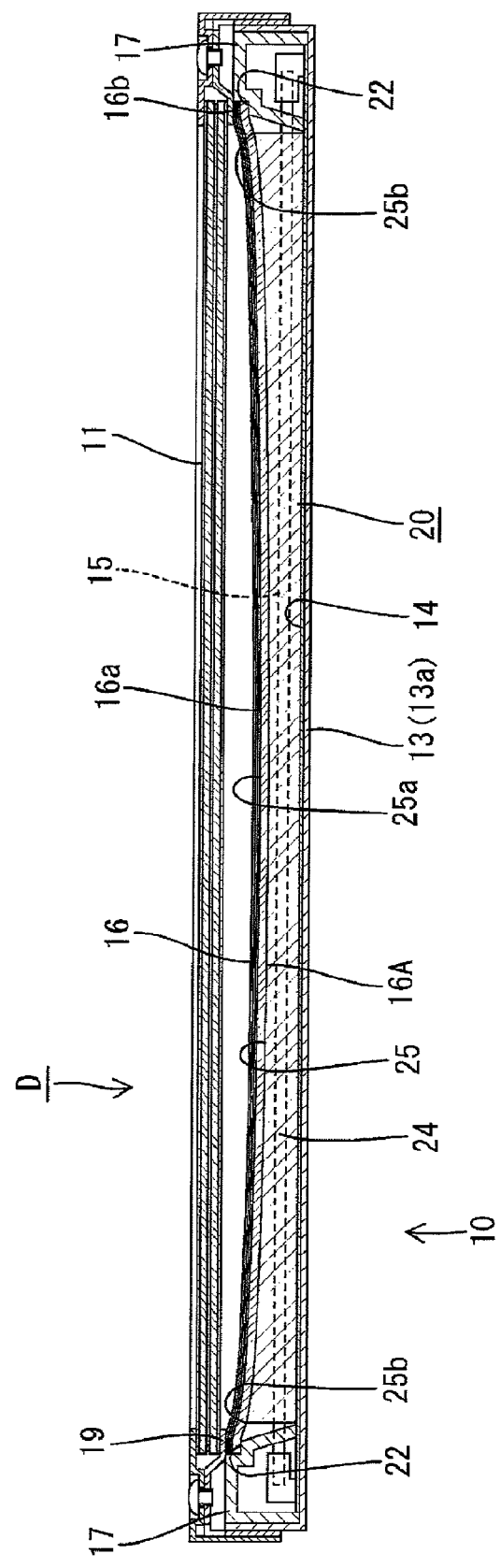
FIG. 5 is a sectional view taken along the line A-A in FIG. 2 of a diffuser plate being warped and deformed.

When the diffuser plate 16A is warped and deformed to some degree, the tip portion 25 of the linear support portion 24 abuts against the back side surface of the diffuser plate 16A. In the linear support portion 24, the height position of the tip portion 25 becomes lower from the opposite end sides toward the middle side in the length direction, and thus as shown in FIG. 5, the optical member 16 can be supported in a height position matching the warped shape in the long side direction. In the linear support portion 24, the height position of the tip portion 25 is fixed over the entire length, and thus the diffuser plate 16A is prevented from being warped beyond the support position, and thus prevented from excessively warped and deformed. Further, since the linear support portion 24 linearly supports the diffuser plate 16A in the long side direction in which the diffuser plate 16A is easily warped, the diffuser plate 16A can be reliably prevented from being bent into a corrugated shape as compared with the case where the diffuser plate 16A is supported at points in the long side direction.

Figure 6:
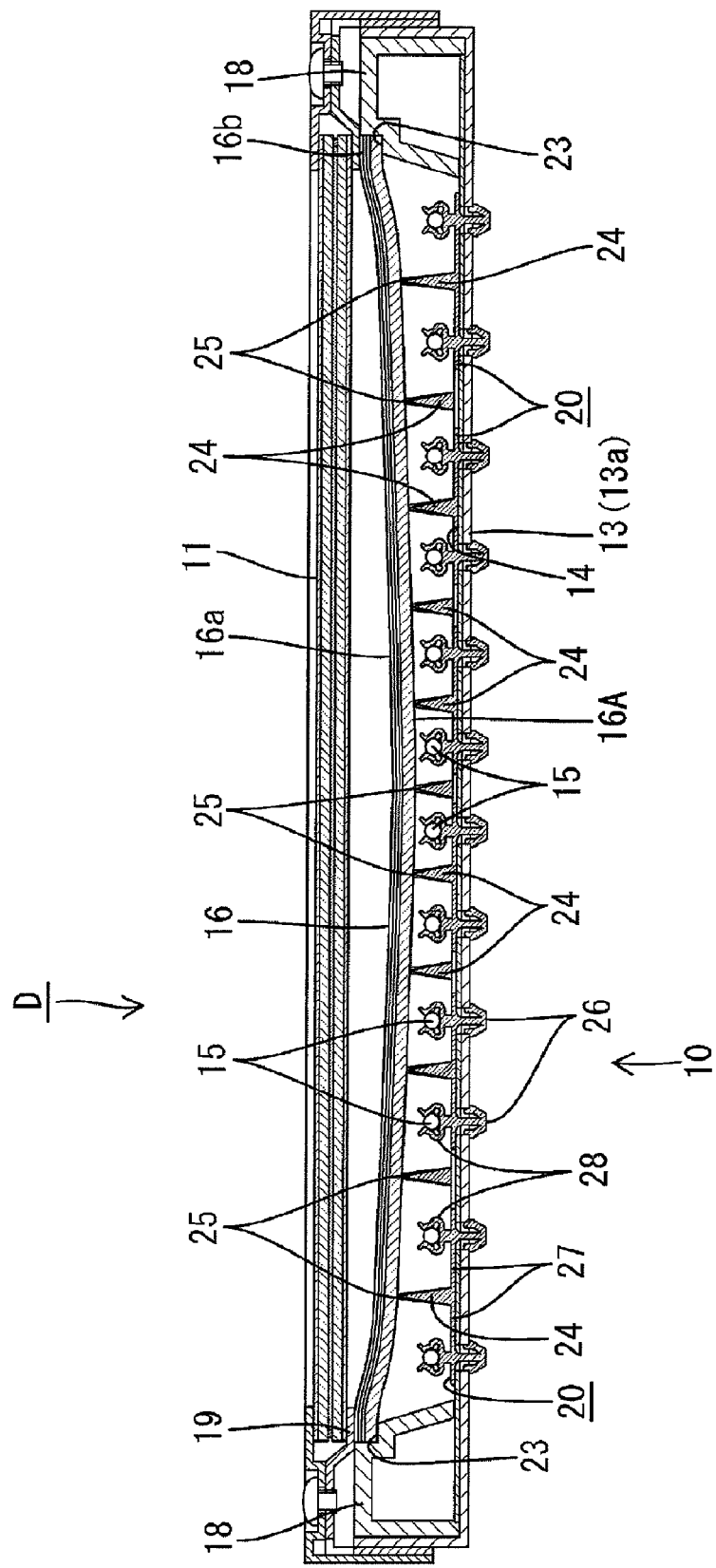
FIG. 6 is a sectional view taken along the line B-B in FIG. 2 of the diffuser plate being warped and deformed.

Further, in the linear support portions 24 arranged in the short side direction of the optical member 16, as shown in FIG. 6, the height position of the tip portion 25 becomes lower from the opposite end sides toward the middle side, and thus the optical member 16 can be supported in the height position matching the warped shape in the short side direction. Since the tip portion 25 of the linear support portion 24 has a point-shaped section in a lateral direction, the linear support portion 24 that supports the diffuser plate 16A is hard to be visually identified from outside.

The middle portion 25a at the lowest level in the length direction of the linear support portion 24 is set at a higher level than the cold cathode tube 15, and the diffuser plate 16A is reliably prevented from coming into contact with the cold cathode tube 15. Even when the diffuser plate 16A is warped and deformed to the maximum, a sufficient distance is ensured from the cold cathode tube 15, thereby preventing a so-called lamp image from being visually identified. This can maintain high display quality of the liquid crystal display device D.

FIGS. 5 and 6 show the case where the diffuser plate 16A is warped to the maximum and abuts against the entire region of each linear support portion 24, but a range in the length direction of abutment of the warped and deformed diffuser plate 16A against the linear support portion 24, or which of the linear support portions 24 arranged in the short side direction of the optical member 16 the diffuser plate 16A abuts against is different depending on the warped state of the diffuser plate 16A, and the entire region of each linear support portion 24 does not always abut against the diffuser plate 16A as shown.

A part of the light emitted from each cold cathode tube 15 is directly directed to the diffuser plate 16A and the other part of the light is reflected by the surface of the reflective sheet 14 or the support component 20 and then directed to the diffuser plate 16A. The linear support portion 24 provided in the support component 20 extends axially of the cold cathode tube 15 and is laterally placed over the entire length and height of the light emitting portion thereof, and thus the light emitted from the cold cathode tube 15 can be effectively reflected toward the diffuser plate 16A. Further, the dark portion is more easily formed between the cold cathode tubes 15 on the end side with a large space between the cold cathode tubes 15 than on the middle side with a small space between the cold cathode tubes 15, but the linear support portion 24 placed on the end side has a larger height and surface area, reflects a larger amount of light, and has higher luminance as an artificial light source than the linear support portion 24 placed on the middle side, thereby effectively eliminating the dark portion.

As described above, according to this embodiment, the support component 20 includes the middle portion 25a (lower support portion) at a relatively low level corresponding to the middle side of the optical member 16, and the end portion 25b (higher support portion) at a relatively high level corresponding to the end side of the optical member 16, and the linear support portion 24 that supports the optical member 16 perpendicularly to the plane direction of the optical member 16 in the fixed position, thereby allowing the optical member 16 to be supported in the position matching the warped shape. Thus, the optical member 16 can be supported in a state where the optical member 16 can be warped and deformed and the optical member 16 is hard to be bent into a corrugated shape. Further, the optical member 16 is supported in the fixed position over the entire length, and thus as compared with the case where the optical member 16 is supported in varying positions, excessive warping deformation of the optical member 16 can be controlled to maintain high display quality.

The linear support portion 24 linearly extends in parallel with the plane direction of the optical member 16, and is curved to become progressively lower from the end sides toward the middle side of the optical member 16, thereby reliably preventing the optical member 16 from being bent in the extending direction of the linear support portion 24.

The plurality of linear support portions 24 are arranged, and the linear support portion 24 placed on the middle side of the optical member 16 supports the optical member 16 in a lower position than the linear support portions 24 placed on the end sides. Thus, even if the optical member 16 is warped perpendicularly to the extending direction of the linear support portion 24, each linear support portion 24 supports the optical member 16 in a position corresponding to the warped shape of the optical member 16. Thus, the optical member 16 can be supported in the state where the optical member 16 can be warped and deformed and the optical member 16 is hard to be bent also in the direction perpendicular to the extending direction.

The extending direction of the linear support portion 24 matches the long side direction of the rectangular optical member 16, and thus the optical member 16 can be linearly supported in the long side direction in which the optical member 16 is easily warped, thereby more effectively preventing problems such as bending that may occur in the optical member 16.

The linear support portion 24 is tapered toward the tip portion 25 that abuts against the optical member 16, and the side surface 24a thereof is the inclined surface. This can avoid the linear support portion 24 from blocking a light emitted from the cold cathode tube 15.

The linear support portion 24 is configured so that the tip portion 25 that abuts against the optical member 16 has the point-shaped section perpendicularly to the extending direction. Thus, the linear support portion 24 supporting the optical member 16 is hard to be visually identified from outside.

The plurality of cold cathode tubes 15 are arranged, the linear support portions 24 are arranged between the cold cathode tubes 15, and the linear support portions 24 have the surface with white base color. Thus, the linear support portion 24 placed in the position between the cold cathode tubes 15 where the dark portion is easily formed can satisfactorily reflect the light, and the linear support portion 24 acts as an artificial light source, thereby eliminating the dark portion between the cold cathode tubes 15 and allowing uniform luminance.

The cold cathode tubes 15 are arranged so that the space therebetween is larger (wider) on the end side than the middle side of the optical member 16, and the linear support portion 24 placed on the end side of the optical member 16 has the larger surface area than the linear support portion 24 placed on the middle side, thereby effectively eliminating the dark portion and allowing uniform luminance.

The extending direction of the linear support portion 24 matches the extending direction of the cold cathode tube 15, and thus the linear support portion 24 acts as the artificial linear light source, which is further effective for uniform luminance. Further, the linear support portion 24 is placed on the lateral position of the light emitting portion of the cold cathode tube 15 over the entire length and height thereof. Thus, the linear support portion 24 can effectively reflect the light emitted from the cold cathode tube 15, which is further effective for uniform luminance.

The support component 20 includes the plate portion 27 along the chassis 13, the linear support portion 24 is connected to the plate portion 27, and the light source gripping portion 28 that can grip the cold cathode tube 15 is provided on the plate portion 27 in the lateral position of the linear support portion 24. This allows the support component 20 to also have a function of gripping the cold cathode tube 15, thereby reducing the number of components as compared with the case of a separate component having the same function.

The diffuser plate 16A is subjected to previous warping so as to be warped and deformed toward the cold cathode tube 15 as the cold cathode tube 15 is lit. This prevents the optical member 16 from being warped and deformed in a reverse direction, thereby allowing the linear support portion 24 to reliably support the optical member 16.

Further, the previous warping includes heating treatment of the surface on the side opposite to the cold cathode tube 15 of the base material of the diffuser plate 16A. This allows previous warping without adding another member to the diffuser plate 16A, and can reduce production costs of the diffuser plate 16A.

Embodiment 2

Embodiment 2 of the present invention will be described with reference to FIG. 7 or 8. In Embodiment 2, the shape of a linear support portion 30 is changed. In Embodiment 2, overlapping descriptions will be omitted on the same structure, operation and advantage as those in Embodiment 1.

Figure 7:
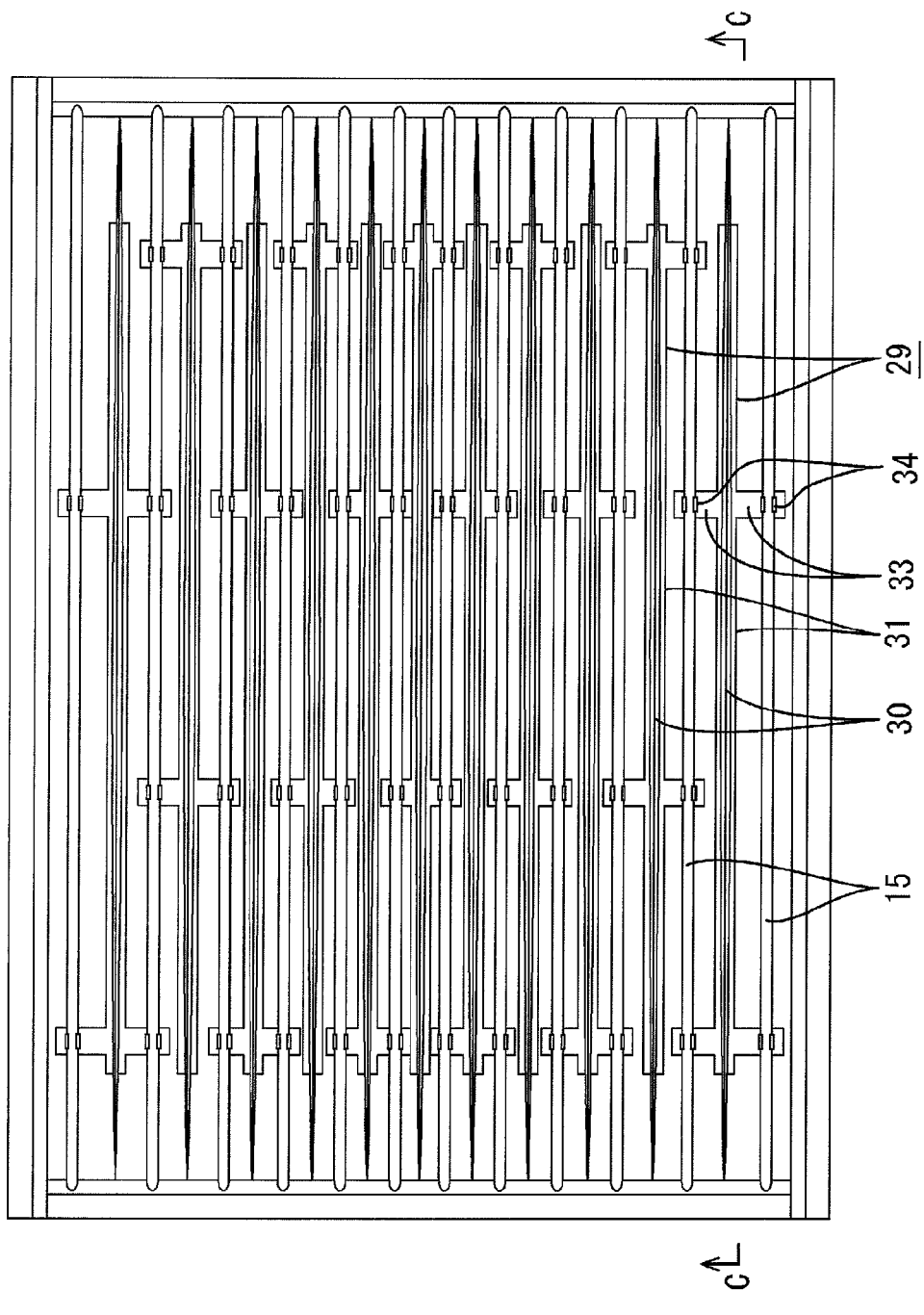
FIG. 7 is a plan view of a backlight according to Embodiment 2 of the present invention.
Figure 8:
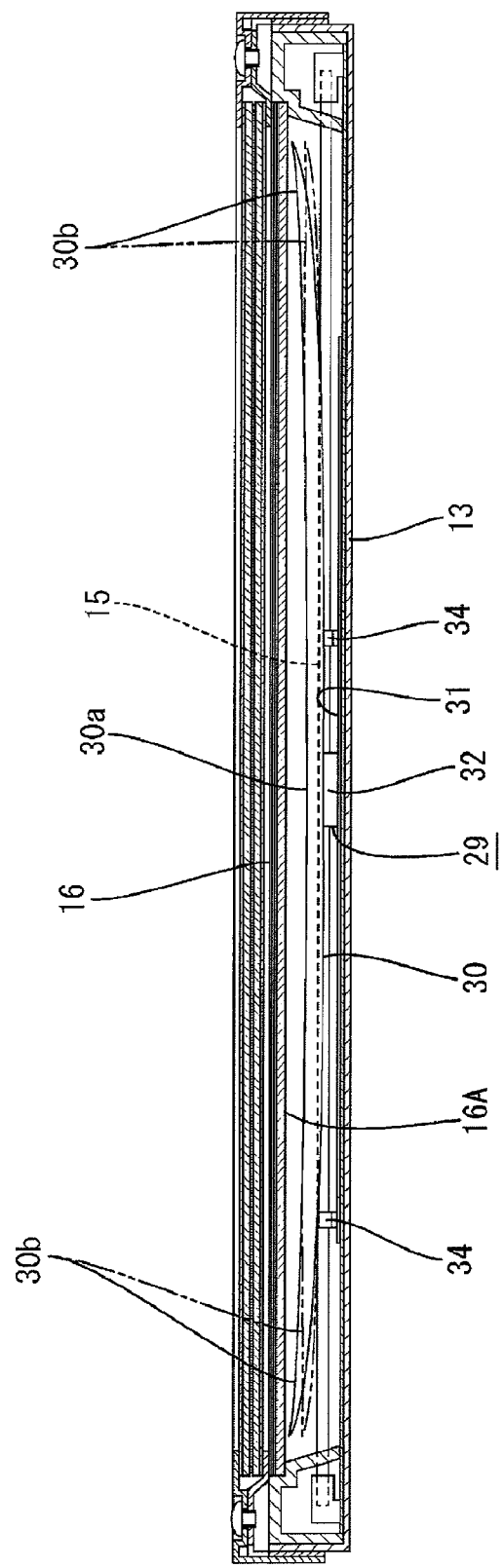
FIG. 8 is a sectional view taken along the line C-C in FIG. 8.

As shown in FIGS. 7 and 8, a support component 29 includes a plate portion 31 extending in parallel with the linear support portion 30, and a middle portion 30a in a length direction of the linear support portion 30 is connected to the plate portion 31 by a connecting portion 32. The connecting portion 32 is a secured part that cannot be elastically deformed, and thus the optical member 16 is supported vertically in a fixed position by the middle portion 30a of the linear support portion 30. Protruding plates 33 protruding toward opposite lateral sides are provided on the plate portion 31, a light source gripping portion 34 that can grip the cold cathode tube 15 protrudes from each protruding plate 33 toward the optical member 16 and is placed adjacent to a lateral side of the linear support portion 30.

The linear support portion 30 has a decreasing width and thickness toward the opposite end sides in the length direction so as to be tapered. Specifically, the linear support portion 30 has a structure in which a pair of elastic arms 30b in a cantilever form extend from the middle portion 30a as the secured part connected to the connecting portion 32 in a long side direction of the chassis 13 or the optical member 16 and an axial direction of the cold cathode tube 15. The elastic arms 30b can be elastically deformed vertically in FIG. 8 (perpendicularly to the plane direction of the optical member 16, in a direction approaching and separating from the optical member 16) with the middle portion 30a as a fulcrum. Thus, the elastic arm 30b can be displaced following a warped shape of the optical member 16.

When the diffuser plate 16A is warped and deformed as the cold cathode tube 15 is lit, the elastic arm 30b is elastically deformed depending on the warped state as shown by a dash-double-dot line in FIG. 8. An acceptable range of warping deformation of the diffuser plate 16A is increased by the elastic deformation of the elastic arm 30b. Meanwhile, the middle portion 30a of the linear support portion 30 is the secured part that cannot be elastically deformed, thereby preventing the middle portion of the diffuser plate 16A from excessively approaching the cold cathode tube 15. The elastic arm 30b is tapered to increase followability to the warped and deformed diffuser plate 16A. From the above, the optical member 16 can be more properly supported.

Embodiment 3

Embodiment 3 of the present invention will be described with reference to FIG. 9. In Embodiment 3, an elastic support portion for supporting an elastic arm 30b' in Embodiment 2 is added. In Embodiment 3, overlapping descriptions will be omitted on the same structure, operation and advantage as those in Embodiment 2.

Figure 9:
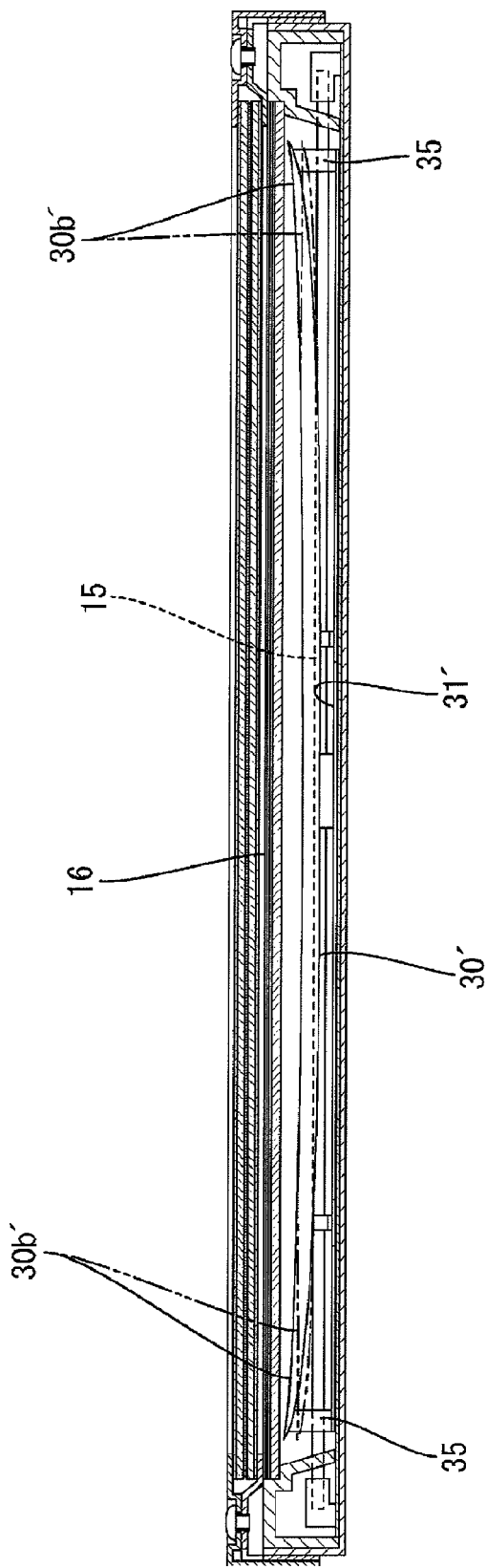
FIG. 9 is a side sectional view of a backlight according to Embodiment 3 of the present invention.

As shown in FIG. 9, elastic arms 30b' of the linear support portion 30' are connected to a plate portion 31' by elastic support portions 35 made of a rubber material or the like. Specifically, each elastic arm 30b' is elastically supported by the elastic support portion 35, and when the elastic arm 30b' is elastically deformed, the elastic support portion 35 is elastically contracted according thereto. Thus, the elastic support portion 35 is added to increase elasticity of the elastic arm 30b'. Thus, the optical member 16 can be more properly supported.

Embodiment 4

Embodiment 4 of the present invention will be described with reference to FIG. 10 or 11. In Embodiment 4, a linear support portion is split. In Embodiment 4, overlapping descriptions will be omitted on the same structure, operation and advantage as those in Embodiment 1.

Figure 10:
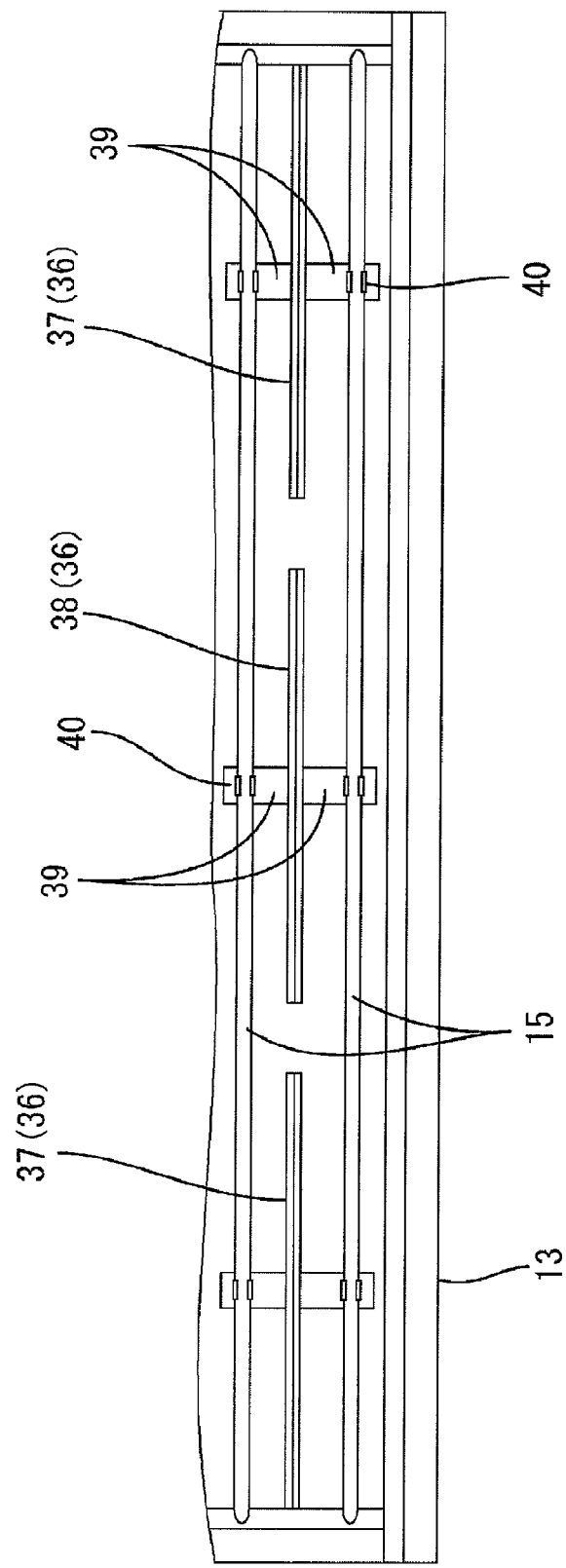
FIG. 10 is a partial plan view of a backlight according to Embodiment 4 of the present invention.
Figure 11:
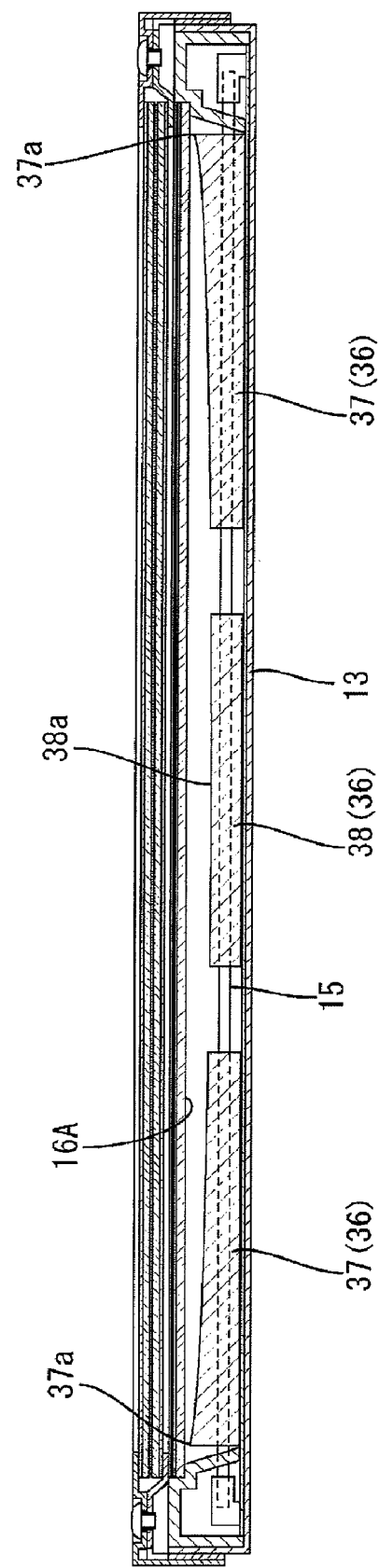
FIG. 11 is a side sectional view of the backlight.

As shown in FIGS. 10 and 11, a linear support portion 36 is split into three short split components 37 and 38 in an extending direction thereof, and the split components 37 and 38 are linearly arranged. Specifically, the split components 37 and 38 are made of synthetic resin having a white surface, placed in opposite end positions and a middle position in a long side direction of the chassis 13, and a predetermined space is provided between adjacent split components 37 and 38 in an arranging direction (the extending direction of the linear support portion 36). Providing positions of the split components 37 and 38, lengths of the split components 37 and 38, and the space between the split components 37 and 38 are set according to luminance distribution of the group of cold cathode tubes 15, and the split components 37 and 38 are placed in regions corresponding to dark portions in the luminance distribution of the group of cold cathode tubes 15.

A tip portion of each of the split components 37 and 38 is formed into a gentle arc shape, which matches an imaginary curve along a supposed warped shape of the diffuser plate 16A. Outer end portions 37a of the split components 37 provided in the opposite end positions in the long side direction of the chassis 13 are higher support portions at the highest level in the linear support portion 36. Meanwhile, a middle portion 38a in a length direction of the split component 38 placed in the middle position is a lower support portion at the lowest level in the linear support portion 36. In each of the split components 37 and 38, a plate portion 39, a light source gripping portion 40, and a locking part (not shown) are provided.

As described above, in this embodiment, the linear support portion 36 is constituted by the three short split components 37 and 38 linearly arranged. Thus, as compared with the case where the linear support portion is produced as one component as in Embodiment 1, the length of each of the split components 37 and 38 can be reduced. This can reduce production costs.

Further, the split components 37 and 38 have surfaces with white base color, the predetermined space is provided between the adjacent split components 37 and 38 in the arranging direction, and the split components 37 and 38 are placed correspondingly to the positions in which the dark portions are formed in the luminance distribution of the cold cathode tube 15. Thus, the split components 37 and 38 reflect a light to eliminate the dark portions in the luminance distribution, thereby allowing uniform luminance.

Embodiment 5

Embodiment 5 of the present invention will be described with reference to FIGS. 12 to 14. In Embodiment 5, split components are connected. In Embodiment 5, overlapping descriptions will be omitted on the same structure, operation and advantage as those in Embodiment 4.

Figure 12:
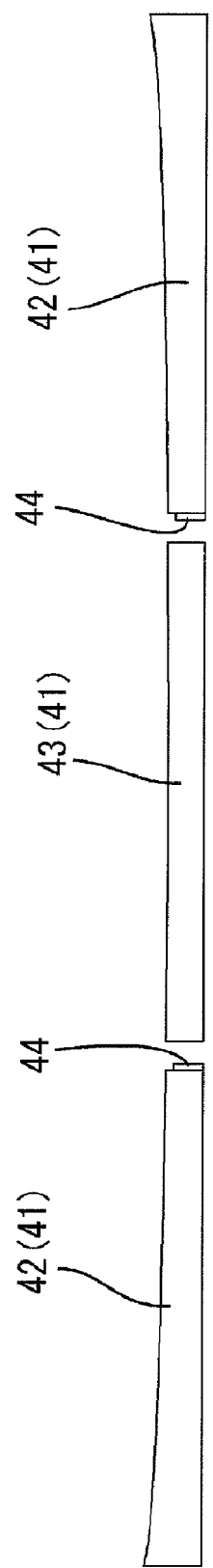
FIG. 12 is a side view of split components of a linear support portion according to Embodiment 5 of the present invention.

As shown in FIG. 12, a linear support portion 41 is constituted by three short split components 42 and 43 linearly arranged, which can be connected by a connecting portion 44. Specifically, each of the split components 42 and 43 has an inverted V-shaped section as shown in FIG. 14. The connecting portion 44 protruding toward the split component 43 on the middle side is provided on an end portion of each of the split components 42 provided in opposite ends, and the connecting portion 44 is inserted into a space on a back side of the split component 43 on the middle side, thereby allowing the split components 42 and 43 to be held in a connected state. The connecting portion 44 has a thickness of substantially half of a thickness of the split component 42 on each end, and has an inverted V-shaped section along the split component 43 in the middle. Though not shown, a plate portion, a light source gripping portion, and a locking part are provided in each of the split components 42 and 43.

Figure 13:
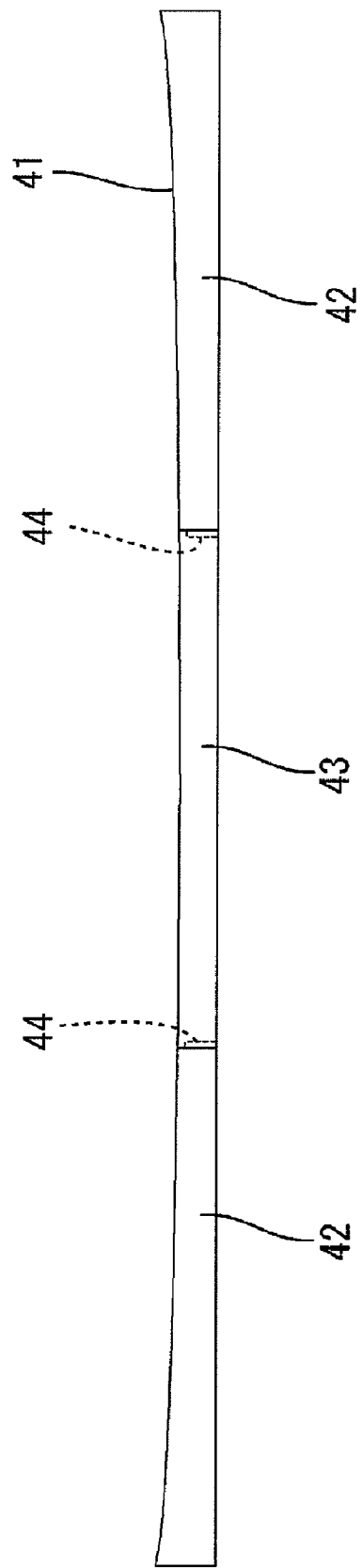
FIG. 13 is a side view of the split components being assembled to each other.
Figure 14:
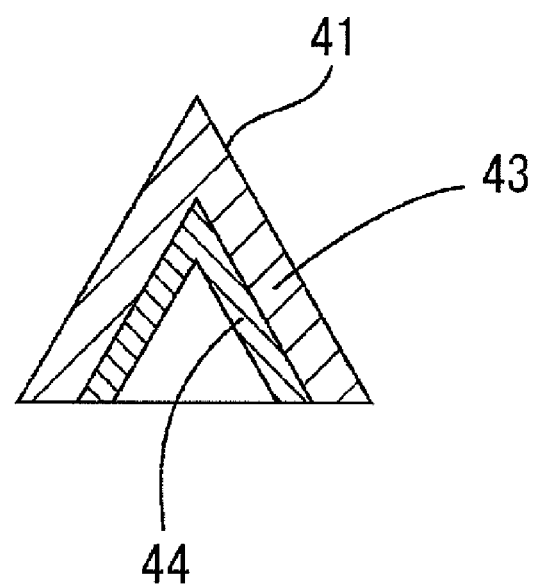
FIG. 14 is a cross sectional view of connection between the split components.

In assembly to the chassis, the three split components 42 and 43 shown in FIG. 12 are assembled and integrated to form the linear support portion 41 shown in FIGS. 13 and 14.

As described above, in this embodiment, the split components 42 and 43 are connected to adjacent split components 42 and 43 in an arranging direction by the connecting portion 44. This allows the split components 42 and 43 to be connected and integrally handled, and provides high assembling workability.

Embodiment 6

Embodiment 6 of the present invention will be described with reference to FIGS. 15 to 17. In Embodiment 6, a connecting portion is changed. In Embodiment 6, overlapping descriptions will be omitted on the same structure, operation and advantage as those in Embodiment 5.

Figure 15:
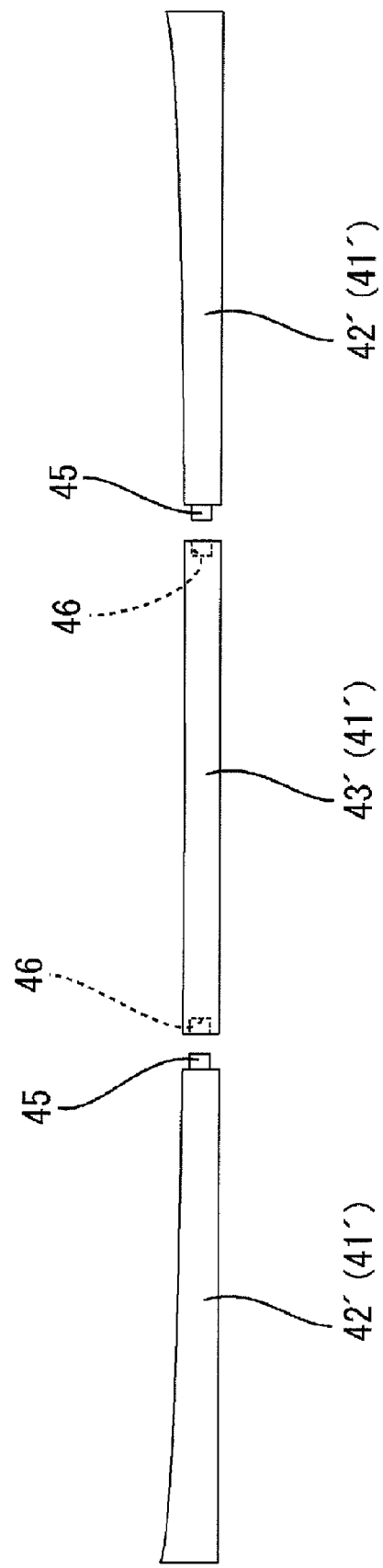
FIG. 15 is a side view of split components of a linear support portion according to Embodiment 6 of the present invention.

In a linear support portion 41', a connecting protrusion 45 protrudes from an end portion of a split component 42' in each of opposite ends toward a split component 43' in the middle as shown in FIG. 15, and in an end portion of the split component 43' in the middle, a connecting recess 46 that can fit the connecting protrusion 45 is provided.

Figure 17:
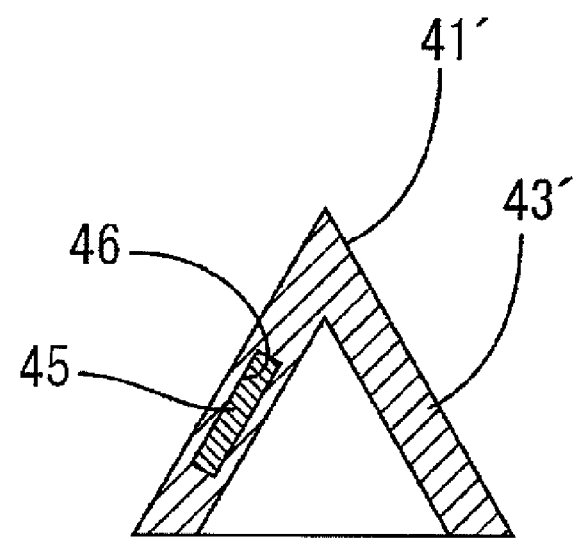
FIG. 17 is a cross sectional view of connection between the split components.

As shown in FIG. 17, the connecting protrusion 45 protrudes from a middle portion in a width direction on an end surface of the split component 42' in each of the opposite ends having an inverted V-shaped section, and has a rectangular section. A thickness of the connecting protrusion 45 is about a half of a thickness of the split component 42'. Meanwhile, the connecting recess 46 is formed by recessing an end surface of the split component 43' on the middle side, and has substantially the same size as the connecting protrusion 45.

Figure 16:
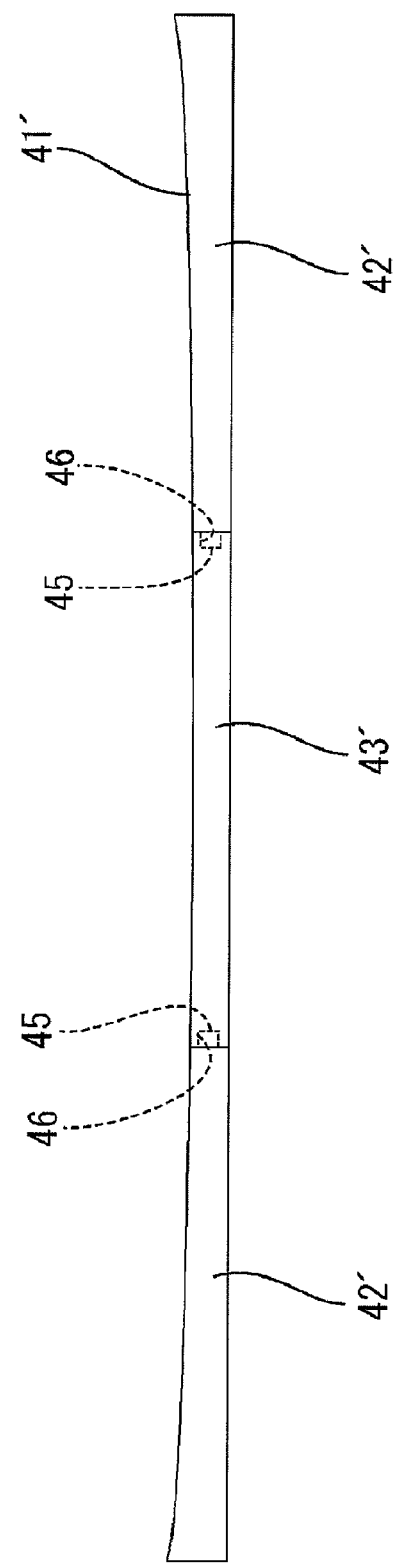
FIG. 16 is a side view of the split components being assembled to each other.

In assembly to the chassis, the three split components 42' and 43' shown in FIG. 15 are assembled and integrated to form the linear support portion 41' shown in FIGS. 16 and 17. At this time, the connecting protrusion 45 fits in the connecting recess 46, and a predetermined friction force is generated between the connecting protrusion 45 and the connecting recess 46, thereby allowing the split components 42' and 43' to be firmly held in a connected state.

Other Embodiments

The present invention is not limited to the embodiments described above with reference to the drawings, but the technical scope of the present invention also covers, for example, the following embodiments.

(1) The shape, length, height or the like of the linear support portion other than those shown may be chosen. Specifically, the shape of the tip portion of the linear support portion is not limited to the pointed shape as in the above described embodiments, but may be, for example, a rounded shape, and the rounded tip portion may be brought into line contact (point contact viewed in a lateral direction) with the diffuser plate. The tip portion of the linear support portion may be brought into surface contact with the diffuser plate. Further, the shape of the tip portion of the linear support portion may be changed according to a predictable warped shape of the diffuser plate.

(2) In the above described embodiments, the case is shown in which the opposite end portions of the tip portion of the linear support portion are located at the height where the end portions do not come into contact with the diffuser plate that is not warped, but the present invention also covers a case in which the end portions are located at substantially the same height as the catch of the lamp holder or the holder, and come into contact with the diffuser plate that is not warped.

(3) In the above described embodiments, the extending direction of the linear support portion matches the long side direction of the chassis or the optical member, but the present invention also covers a case in which the axial direction of the cold cathode tube matches the short side direction of the chassis or the optical member, and the extending direction of the linear support portion matches the short side direction. Further, the present invention also covers a case in which the extending direction of the linear support portion is inclined with respect to the long side direction and the short side direction of the chassis or the optical member.

(4) In the above described embodiments, the heights of the linear support portions arranged in the short side direction of the chassis or the optical member gradually change, but the heights of some linear support portions placed on the middle side may be the same according to the warped shape of the optical member, which is also covered by the present invention.

(5) In the above described embodiments, the linear support portion is interposed between the cold cathode tubes, but the linear support portions do not always need to be provided between all the cold cathode tubes, and the present invention also covers a case with the linear support portions partially omitted.

(6) In the above described embodiments, the linear support portions arranged in the short side direction of the optical member are arranged symmetrically, but the present invention also covers a case in which the linear support portions are arranged asymmetrically. In the above described embodiments, the linear support portion has a symmetrical shape with respect to an axis of symmetry in the middle in the length direction, but the present invention also covers a case in which the linear support portion has an asymmetrical shape.

(7) In the above described embodiments, the cold cathode tubes are arranged symmetrically, but the present invention also covers a case in which the cold cathode tubes are arranged asymmetrically.

(8) In the above described embodiments, so-called variable pitch arrangement is exemplified in which the space between the cold cathode tubes is larger on the end side than on the middle side of the optical member, but the present invention also covers constant pitch arrangement in which all the spaces between the cold cathode tubes are the same. The present invention further covers a combination of constant pitch arrangement and variable pitch arrangement, for example, with the constant pitch arrangement on the middle side of the optical member and the variable pitch arrangement on the end side of the optical member. Also in this case, the linear support portion may be placed in the middle position between the cold cathode tubes.

(9) In the above described embodiments, the support component has the white surface, but not limited to white, and for example, other white base colors such as semi-opaque may be chosen. Colors other than the white base color may be chosen.

(10) In the above described embodiments, the light source gripping portion that grips the cold cathode tube is provided in the support component, but the light source gripping portion may be omitted.

(11) In the above described embodiments, as the previous warping of the diffuser plate, heat treatment of one side of the base material is performed in a production process of the diffuser plate, but other methods may be used. Specifically, methods in the following (12) and (13) may be used.

Figure 18:
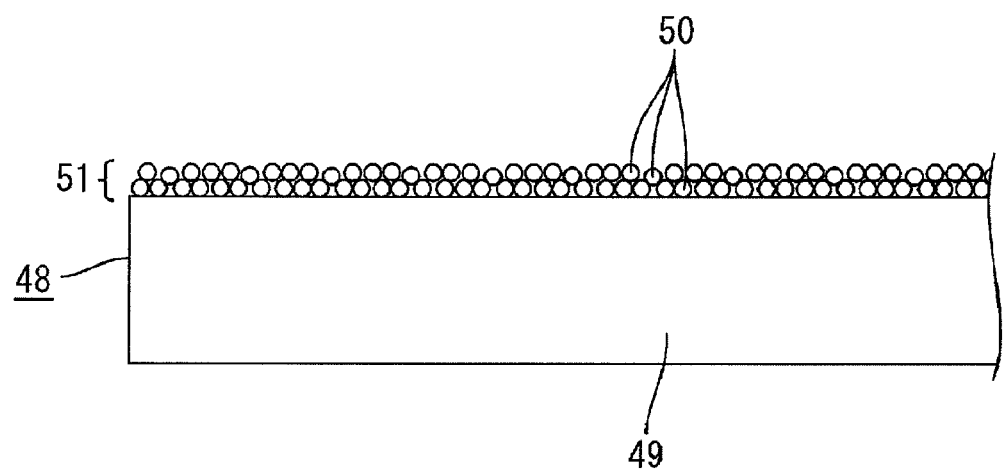
FIG. 18 is a partial side view of a diffuser plate according to another embodiment (12)

(12) As a specific example of the previous warping, as shown in FIG. 18, a previous warping layer 51 constituted by beads 50 is formed on a surface on the side of the liquid crystal panel (the side opposite to the cold cathode tube) of a base material 49 of a diffuser plate 48, and the previous warping layer 51 has a linear expansion coefficient lower than that of the base material 49 placed on the side of the cold cathode tube. Thus, this provides a warping habit to the diffuser plate 48 so as to be reliably warped toward the cold cathode tube when the cold cathode tube is lit and the temperature in the backlight is increased. The previous warping layer 51 is formed by applying or dropping a predetermined solvent mixed with a plurality of beads 50 on a surface of the base material 49, and then volatilizing or draining the solvent. Other than the above, the previous warping layer 51 may be formed on the side of the cold cathode tube of the base material 49, and the previous warping layer 51 placed on the side of the cold cathode tube may have a linear expansion coefficient higher than that of the base material 49.

Figure 19:
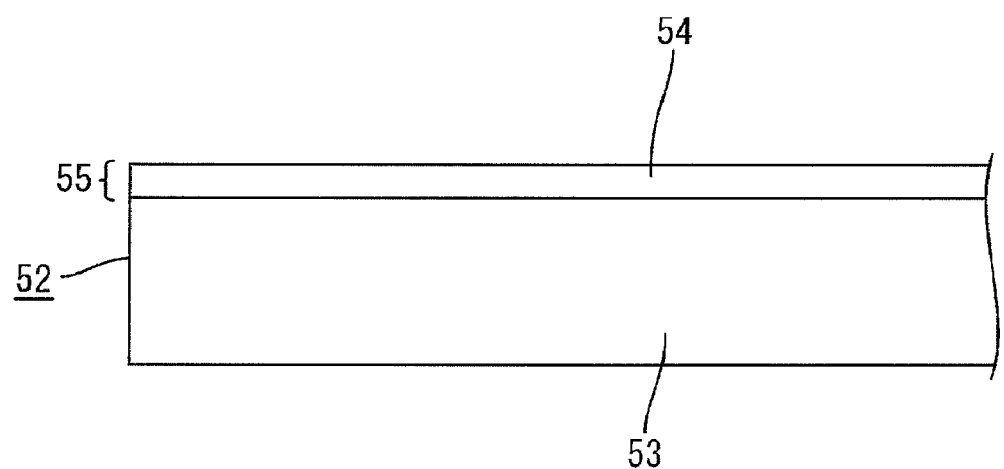
FIG. 19 is a partial side view of a diffuser plate according to a further embodiment (13)

(13) As a specific example of the previous warping, as shown in FIG. 19, a previous warping layer 55 formed of a sheet material 54 is formed on the side of the liquid crystal panel of a base material 53 of a diffuser plate 52, and the previous warping layer 55 has a linear expansion coefficient lower than that of the base material 53. Thus, the same advantage of previous warping as in (12) can be obtained. The previous warping layer 55 is formed by attaching a synthetic resin sheet material 54 to a surface of the base material 53, and an adhesive layer (not shown) of an acrylic UV curing adhesive, an acrylic pressure sensitive adhesive, or the like may be formed between the sheet material 54 and the base material 53 in attachment. Other than the above, the previous warping layer 55 may be formed on the side of the cold cathode tube of the base material 53, and the previous warping layer 55 placed on the side of the cold cathode tube may have a linear expansion coefficient higher than that of the base material 53.

(14) In the above described embodiments, the previous warping of the diffuser plate is performed, but the diffuser plate can be predicted to be warped toward the cold cathode tube without previous warping in some cases according to design of a backlight. In such a case, a diffuser plate that is not subjected to previous warping can be used. Other than the above, for example, when the optical member is partially pressed from the side of the liquid crystal panel to forcedly warp and deform the diffuser plate toward the cold cathode tube, a diffuser plate that is not subjected to previous warping can be used.

Figure 20:
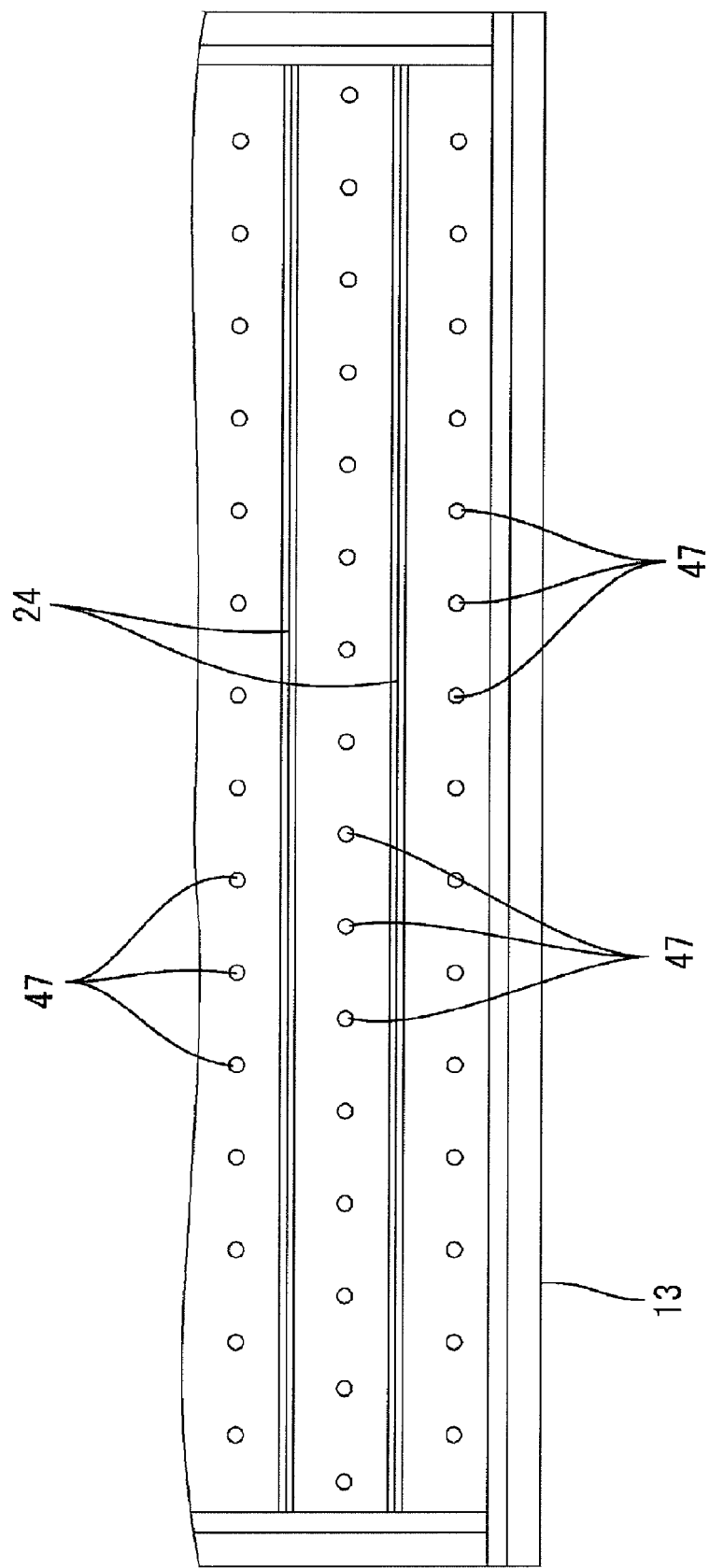
FIG. 20 is a partial plan view of a backlight according to a further embodiment (15).

(15) In the above described embodiments, the cold cathode tube is exemplified as the light source, but the present invention may be applied to a case including a different type of linear light source such as a hot cathode tube or a fluorescent tube or a point light source such as an LED as a light source. A specific example using the point light source will be described. Specifically, as shown in FIG. 20, a plurality of LEDs 47 are arranged along a line extending in one direction on a bottom plate of a chassis 13, a linear support portion 24 is provided in a lateral position of the group of LEDs 47, and an extending direction of the linear support portion 24 matches an arranging direction of the group of LEDs 47. Thus, the linear support portion 24 can effectively reflect a light emitted from each LED 47, which is effective for uniform luminance.

(16) In the above described embodiments, the liquid crystal display device using the liquid crystal panel as a display panel is exemplified, but the present invention can be applied to a display device using a different type of display panel.

(17) In the above described embodiments, the television receiver apparatus including the tuner is exemplified, but the present invention can be applied to a display device that does not include a tuner.

The invention claimed is:

1. A lighting device for a display device comprising:
a chassis housing a light source that applies a light to a display panel that displays an image;
a planar optical member provided on a light emission side from the light source; and
a support component that is mounted to said chassis and can support said optical member from the side of said light source,
wherein said support component includes a lower support portion corresponding to a middle side of said optical member and a higher support portion corresponding to an end side of said optical member, and supports said optical member perpendicularly to a plane direction of said optical member in a fixed position at least in said lower support portion, and wherein
said support component includes a linear support portion linearly extending in parallel with the plane direction of said optical member, and curved so that said optical member becomes progressively lower from the end side toward the middle side, and the linear support portion includes said lower support portion and said higher support portion.

2. The lighting device for a display device according to claim 1, wherein said support component includes a plate portion along said chassis, said linear support portion is connected to the plate portion, and a light source gripping portion that can grip said light source is provided on the plate portion in a lateral position of said linear support portion.

3. The lighting device for a display device according to claim 1, wherein a plurality of said linear support portions are arranged in parallel, and said linear support portions placed on the middle side of said optical member support said optical member in lower positions than said linear support portions placed on the end side.

4. The lighting device for a display device according to claim 1, wherein when said optical member has a rectangular shape, and an extending direction of said linear support portion matches a long side direction of said optical member.

5. The lighting device for a display device according to claim 1, wherein said linear support portion is tapered toward a tip portion that abuts against said optical member, and has an inclined side surface.

6. The lighting device for a display device according to claim 5, wherein said linear support portion is configured so that the tip portion that abuts against said optical member has a point-shaped section perpendicularly to the extending direction.

7. The lighting device for a display device according to claim 1, wherein when a plurality of said light sources are arranged and said linear support portion is placed between each of said light sources, said linear support portion has a surface with white base color.

8. The lighting device for a display device according to claim 7, wherein a plurality of said linear support portions placed between said light sources are arranged in parallel, said light sources are arranged so that a space between adjacent light sources is larger on the end side than the middle side of said optical member, and
said linear support portion placed on the end side of said optical member has a larger surface area than said linear support portion placed on the middle side.

9. The lighting device for a display device according to claim 7, wherein when said light source is an elongated linear light source extending in one direction, an extending direction of said linear support portion matches an extending direction of said linear light source.

10. The lighting device for a display device according to claim 9, wherein said linear support portion is placed on a lateral position of a light emitting portion of said linear light source over the entire length thereof.

11. The lighting device for a display device according to claim 9, wherein said linear support portion is placed on a lateral position of the light emitting portion of said linear light source over the entire height thereof.

12. The lighting device for a display device according to claim 7, wherein when said light source is a point light source, and a plurality of said point light sources are arranged along a line extending in one direction, an extending direction of said linear support portion matches an arranging direction of said point light sources.

13. The lighting device for a display device according to claim 1, wherein opposite end portions at a higher level than the middle side of said linear support portion are configured to be elastic arms in a cantilever form and elastically deformable.

14. The lighting device for a display device according to claim 13, wherein said support component includes a plate portion along said chassis, a middle portion of said linear support portion is connected to the plate portion by a connecting portion, and an elastic support portion made of an elastic material is interposed between said elastic arm and said plate portion.

15. The lighting device for a display device according to claim 13, wherein said elastic arm is tapered.

16. The lighting device for a display device according to claim 1, wherein said linear support portion is split into a plurality of short split components, and said split components are linearly arranged.

17. The lighting device for a display device according to claim 16, wherein said split component has a surface with white base color and is arranged with a predetermined space from an adjacent split component in an arranging direction and correspondingly to a position in which a dark portion is formed in luminance distribution of said light source.

18. The lighting device for a display device according to claim 16, wherein said split component is connected to an adjacent split component in an arranging direction by a connecting portion.

19. The lighting device for a display device according to claim 1, wherein said optical member is subjected to treating so as to be warped and deformed toward said light source as said light source is lit.

20. The lighting device for a display device according to claim 19, wherein said treating includes heating treatment of a surface on the side opposite to said light source of a base material of said optical member.

21. The lighting device for a display device according to claim 19, wherein said treating includes forming a treating layer constituted by beads on one of a surface on the side of said light source and a surface on the opposite side of the base material of said optical member by coating, and one of the treating layer and the base material placed on the side of said light source has a linear expansion coefficient higher than that of the other placed on the opposite side.

22. The lighting device for a display device according to claim 19, wherein said treating includes attaching a treating layer formed of a sheet material to one of the surface on the side of said light source and the surface on the opposite side of the base material of said optical member, and one of the treating layer and said base material placed on the side of said light source has a linear expansion coefficient higher than that of the other placed on the opposite side.

23. A display device comprising:
a lighting device for a display device according to claim 1, and
a display panel placed on a front side of the lighting device for a display device.

24. The display device according to claim 23, wherein said display panel is a liquid crystal panel formed by sealing a liquid crystal between a pair of substrates.

25. A television receiver apparatus comprising a display device according to claim 23.

* * * * *